US010725174B2

(12) United States Patent
Jalilian et al.

(10) Patent No.: US 10,725,174 B2
(45) Date of Patent: Jul. 28, 2020

(54) METHOD AND SYSTEM FOR DETERMINING THE DISTANCE TO AN ACOUSTICALLY REFLECTIVE OBJECT IN A CONDUIT

(71) Applicant: Hifi Engineering Inc., Calgary (CA)

(72) Inventors: Seyed Ehsan Jalilian, Calgary (CA); Arne Dankers, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 341 days.

(21) Appl. No.: 15/753,528

(22) PCT Filed: Aug. 22, 2016

(86) PCT No.: PCT/CA2016/050983
§ 371 (c)(1),
(2) Date: Feb. 19, 2018

(87) PCT Pub. No.: WO2017/031578
PCT Pub. Date: Mar. 2, 2017

(65) Prior Publication Data
US 2018/0231658 A1    Aug. 16, 2018

Related U.S. Application Data

(60) Provisional application No. 62/209,209, filed on Aug. 24, 2015.

(51) Int. Cl.
*G01S 15/00* (2020.01)
*G01S 15/08* (2006.01)
(Continued)

(52) U.S. Cl.
CPC .............. *G01S 15/08* (2013.01); *E21B 47/04* (2013.01); *E21B 47/091* (2013.01); *F17D 3/01* (2013.01);
(Continued)

(58) Field of Classification Search
USPC .......................................................... 367/99
See application file for complete search history.

(56) References Cited

U.S. PATENT DOCUMENTS

| 4,766,436 A | 8/1988 | Crepin et al. |
| 4,829,489 A | 5/1989 | Rector |

(Continued)

OTHER PUBLICATIONS

International Search Report and Written Opinion of the International Searching Authority, dated Oct. 31, 2016, for corresponding International Application No. PCT/CA2016/050983, 7 pages.

*Primary Examiner* — James R Hulka
(74) *Attorney, Agent, or Firm* — Klarquist Sparkman, LLP

(57) ABSTRACT

Methods and systems for estimating a distance between an acoustic sensor and an acoustic reflector in a conduit are disclosed. One such method includes using the acoustic sensor to measure a combined acoustic signal that comprises an originating acoustic signal propagating along the conduit and an echo signal. The echo signal is generated by the originating acoustic signal reflecting off the acoustic reflector after propagating past the acoustic sensor. A frequency domain representation of the combined acoustic signal is determined and the echo signal is identified by identifying in the frequency domain representation periodic oscillations having a peak-to-peak difference between 0.75 Hz and 1500 Hz. The distance between the acoustic sensor and the acoustic reflector is determined from the velocity of the echo signal and a time required for the echo signal to propagate between the acoustic sensor and the acoustic reflector.

16 Claims, 14 Drawing Sheets

(51) Int. Cl.

| | | |
|---|---|---|
| *G01S 7/521* | (2006.01) | |
| *F17D 3/01* | (2006.01) | |
| *G01S 7/536* | (2006.01) | |
| *E21B 47/04* | (2012.01) | |
| *E21B 47/09* | (2012.01) | |
| *F17D 5/06* | (2006.01) | |
| *G01H 9/00* | (2006.01) | |
| *G01S 7/54* | (2006.01) | |

(52) U.S. Cl.
CPC ............... *F17D 5/06* (2013.01); *G01H 9/004* (2013.01); *G01S 7/521* (2013.01); *G01S 7/536* (2013.01); *G01S 7/54* (2013.01); *G01H 9/008* (2013.01)

(56) References Cited

U.S. PATENT DOCUMENTS

| | | | |
|---|---|---|---|
| 5,197,019 A | 3/1993 | Delon-Martin et al. | |
| 6,131,694 A | 10/2000 | Robbins et al. | |
| 6,138,512 A * | 10/2000 | Roberts | G01M 3/243 |
| | | | 73/40 |
| 7,496,482 B2 * | 2/2009 | Araki | G10L 21/0272 |
| | | | 375/232 |
| 2005/0117454 A1* | 6/2005 | Millikin | G01S 5/28 |
| | | | 367/127 |
| 2006/0058983 A1* | 3/2006 | Araki | G10L 21/0272 |
| | | | 702/190 |

* cited by examiner 1705m depth 1710m depth 1715m depth

METHOD AND SYSTEM FOR DETERMINING THE DISTANCE TO AN ACOUSTICALLY REFLECTIVE OBJECT IN A CONDUIT

CROSS REFERENCE TO RELATED APPLICATIONS

This is the U.S. National Stage of International Application No. PCT/CA2016/050983, filed Aug. 22, 2016, which in turn claims the benefit of U.S. Provisional Application No. 62/209,209, filed Aug. 24, 2015. The provisional application is incorporated herein in its entirety.

TECHNICAL FIELD

The present disclosure is directed at methods and systems for determining the distance between an acoustic sensor and one or more acoustic reflectors within a conduit. More particularly, the present disclosure is directed at methods and systems for determining the distance between an acoustic sensor and an acoustic reflector within a conduit using acoustic reflections from the acoustic reflector.

BACKGROUND

Fluid migration in oil or gas wells is generally referred to as casing vent flow ("CVF") or gas migration ("GM"). Fluid includes gas or liquid hydrocarbons, including oil, as well as water, steam, or a combination thereof. Any fluid migration will produce an acoustic signal, such as a hiss from high pressurized gas seeping into a wellbore, or from fluid bubbling into the wellbore. Acoustic signals resulting from the migration of fluid may be used as an identifier of a leaking wellbore. Similarly, acoustic signals from leaks in other fluid containing conduits, such as pipelines, may also be used to identify the leak.

Fibre optic cables, acoustic sensor arrays and other acoustic sensing tools can be deployed in a conduit, such as a wellbore or pipeline, for detecting acoustic signals and locating fluid leaks. The acoustic sensing tools capture and detect acoustic signals and translate these signals to optical energy to provide a profile of the conduit. The acoustic data can be digitally processed by software algorithms to determine the origin of different sounds, allowing the location of the leak to be pinpointed. There exists a continued desire to advance and improve the tools in creating a profile of conduits such as wellbores and pipes.

SUMMARY

In accordance with an illustrative embodiment of the disclosure, there is provided a method for estimating a distance between an acoustic sensor and an acoustic reflector in a conduit. The method includes measuring at the acoustic sensor a combined acoustic signal that comprises an originating acoustic signal propagating along the conduit and an echo signal. The echo signal is generated by the originating acoustic signal reflecting off the acoustic reflector after propagating past the acoustic sensor. The method also includes determining a frequency domain representation of the combined acoustic signal and identifying the echo signal by analyzing the frequency domain representation, where the analyzing comprises identifying in the frequency domain representation periodic oscillations having a peak-to-peak difference between 0.75 Hz and 1500 Hz. The method further includes determining the distance between the acoustic sensor and the acoustic reflector from the velocity of the echo signal as it propagates between the acoustic sensor and the acoustic reflector and a time required for the echo signal to propagate between the acoustic sensor and the acoustic reflector.

The time required may be estimated by determining an inverse of an average peak-to-peak distance of the periodic oscillations on the frequency domain representation of the combined acoustic signal and dividing the inverse by two.

The time required may be estimated by measuring the time between an initial detection of the originating acoustic signal and an initial detection of the combined acoustic signal, as marked by the appearance of the periodic oscillations and dividing the measured time by two.

The distance between the acoustic sensor and the acoustic reflector may be determined by using the equation $d = v \times h/2$ wherein d is the distance between the acoustic sensor and the acoustic reflector, v is the velocity of sound in the conduit, and h is a time delay between the originating acoustic signal and the echo signal.

The acoustic sensor may comprise multiple sensors spaced apart along a length of the conduit.

The velocity of the echo signal as it propagates between the acoustic reflector and the acoustic sensor may be estimated from delay times between the originating acoustic signal and the echo signal at points spaced apart along the conduit and the distance between the points.

The conduit may be a wellbore. The conduit may also be a pipeline.

The acoustic sensor may be an optical fiber sensor comprising fiber Bragg gratings ("FBGs") for performing fiber Bragg grating based interferometry.

In accordance with another illustrative embodiment of the disclosure, there is provided a system for estimating a distance between an acoustic sensor and an acoustic reflector in a conduit. The system includes the acoustic sensor for measuring a combined acoustic signal that comprises an originating acoustic signal and an echo signal. The echo signal is generated by the originating acoustic signal reflecting off the acoustic reflector after propagating past the acoustic sensor. The acoustic sensor is also for converting the combined acoustic signal to an output signal and outputting the output signal to a processing unit, where the acoustic sensor is communicatively coupled to the processing unit. The system also includes the processing unit for analyzing the output signal to determine a frequency domain representation of the combined acoustic signal, to identify the echo signal by analyzing the frequency domain representation, where the analyzing includes identifying in the frequency domain representation periodic oscillations having a peak-to-peak difference between 0.75 Hz and 1500 Hz, and to determine a distance between the acoustic sensor and the acoustic reflector from the velocity of the echo signal as it propagates between the acoustic sensor and the acoustic reflector and the time required for the echo signal to propagate between the acoustic sensor and the acoustic reflector.

The acoustic sensor may be an optical fiber sensor comprising fiber Bragg gratings ("FBGs") for performing fiber Bragg grating based interferometry.

The acoustic sensor may comprise multiple sensors spaced apart along a length of the conduit.

In accordance with another illustrative embodiment of the disclosure, there is provided a non-transitory computer readable medium having stored thereon program code to cause a processor to perform a method for estimating a distance between an acoustic sensor and an acoustic reflector in a conduit. The method includes measuring at the acoustic sensor a combined acoustic signal that comprises an originating acoustic signal propagating along the conduit and an echo signal. The echo signal is generated by the originating acoustic signal reflecting off the acoustic reflector after propagating past the acoustic sensor. The method also includes determining a frequency domain representation of the combined acoustic signal and identifying the echo signal by analyzing the frequency domain representation, where the analyzing comprises identifying in the frequency domain representation periodic oscillations having a peak-to-peak difference between 0.75 Hz and 1500 Hz. The method further includes determining the distance between the acoustic sensor and the acoustic reflector from the velocity of the echo signal as it propagates between the acoustic sensor and the acoustic reflector and a time required for the echo signal to propagate between the acoustic sensor and the acoustic reflector.

In accordance with another illustrative embodiment of the disclosure, there is provided a method for estimating a lag time between an originating acoustic signal and an echo signal in a conduit. The method includes measuring at a first position a combined acoustic signal that comprises the originating acoustic signal propagating along the conduit and the echo signal, where the echo signal is generated by the originating acoustic signal reflecting off of an acoustic reflector in the conduit after propagating past the first position. The method also includes determining an autocorrelation of the combined acoustic signal and identifying the echo signal by identifying a peak at a time greater than zero, where the time greater than zero is the lag time.

The method may also include determining a distance between the first position and the acoustic reflector from a velocity of the echo signal as it propagates between the first position and the acoustic reflector and the lag time.

The method may also include determining a location of the acoustic reflector by repeating steps a to c at multiple distances along the conduit, plotting lag time versus distance for each distance and determining a y-intercept of the plot.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate non-limiting embodiments of the invention.

DETAILED DESCRIPTION

Figure 1:
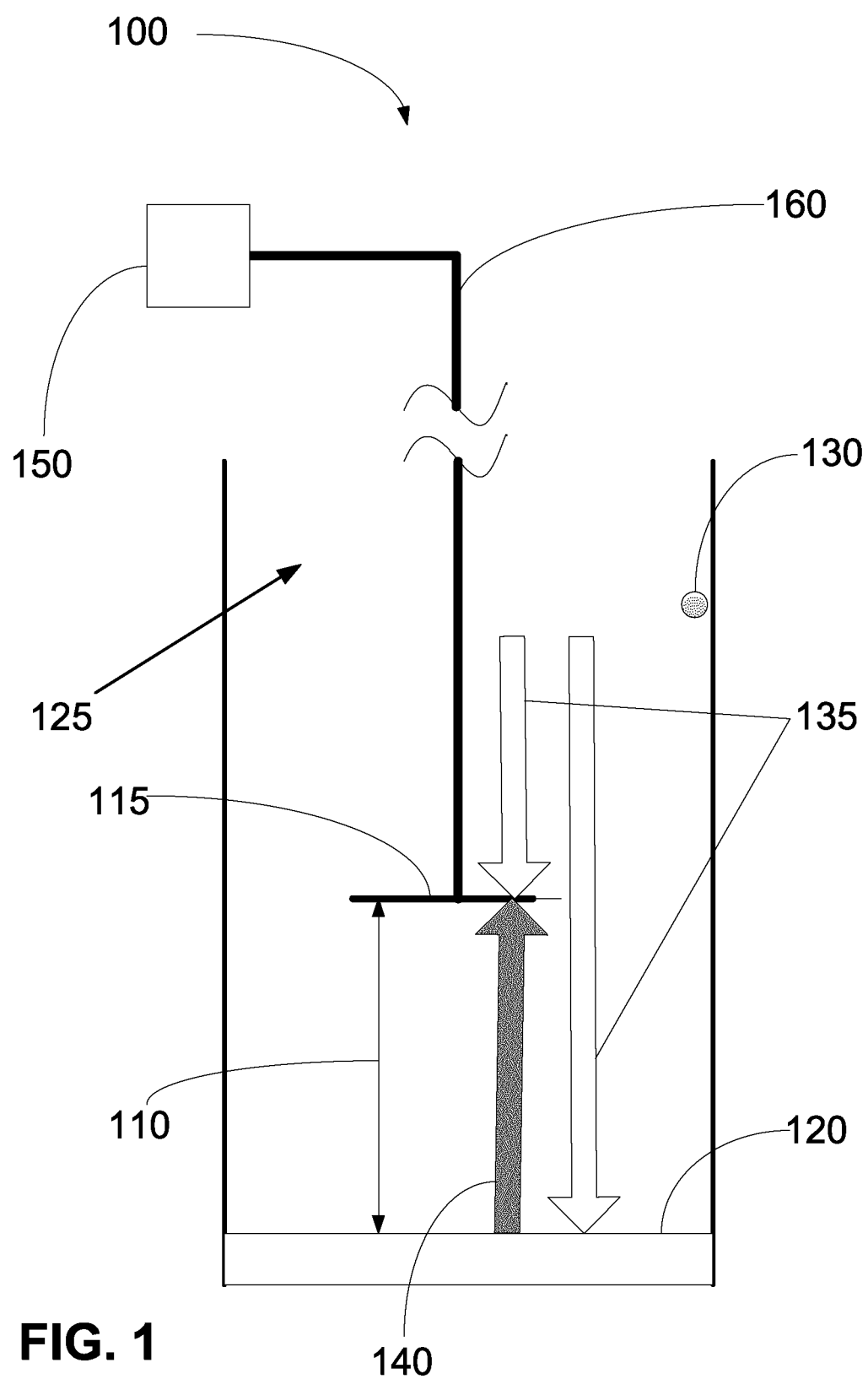
FIG. 1 is a schematic of a system for estimating a distance between an acoustic sensor and an acoustic reflector in a conduit, according to a first embodiment.

Referring to FIG. 1, there is shown an embodiment of a system 100 for estimating a distance 110 between an acoustic sensor 115 and an acoustic reflector 120 in a conduit 125. The acoustic sensor 115 measures a combined acoustic signal that comprises an originating acoustic signal 135 propagating along the conduit and an echo signal 140. The echo signal 140 is generated by the originating acoustic signal 135 reflecting off the acoustic reflector 120 after propagating past the acoustic sensor 115.

A method for estimating a distance between an acoustic sensor 115 and an acoustic reflector 120 in a conduit 125 along which is an acoustic source 130 by using the acoustic sensor 115 to measure a combined acoustic signal permits estimating a location of a plug in a wellbore or pipe by using sensors already deployed. This may result, in some cases, in the deployment of fewer additional sensors and hardware, resulting in a lower expenditure of resources. In the case of pipelines or horizontal wellbores, reflection detection may be used, for example, to detect blockages such as sand or wax buildup. In vertical wells, reflection detection may be used to, for example, detect the fluid level in the well or the location of the surface casing shoe.

The acoustic sensor 115 is communicatively coupled to a processing unit 150. In this embodiment, the acoustic sensor 115 is communicatively coupled to the processing unit 150 via a deployment line 160. In some embodiments, the acoustic sensor 115 may comprise one or more acoustic sensors attached at multiple points along the length of the deployment line 160. The deployment line 160 spans any desired depth or region of the conduit 125 to be logged.

The deployment line 160 may be any suitable deployment line for deploying the acoustic sensor 115, for example, but not limited to, a slickline, coiled tubing, tractor, braided line or a wireline containing an optical fiber.

The acoustic sensor 115 converts the combined acoustic signal to an output signal, such as, for example, an optical signal, and outputs it to the processing unit 150. Alternatively, any suitable output signal may be used, such as, for example, an electrical signal.

Figure 2:
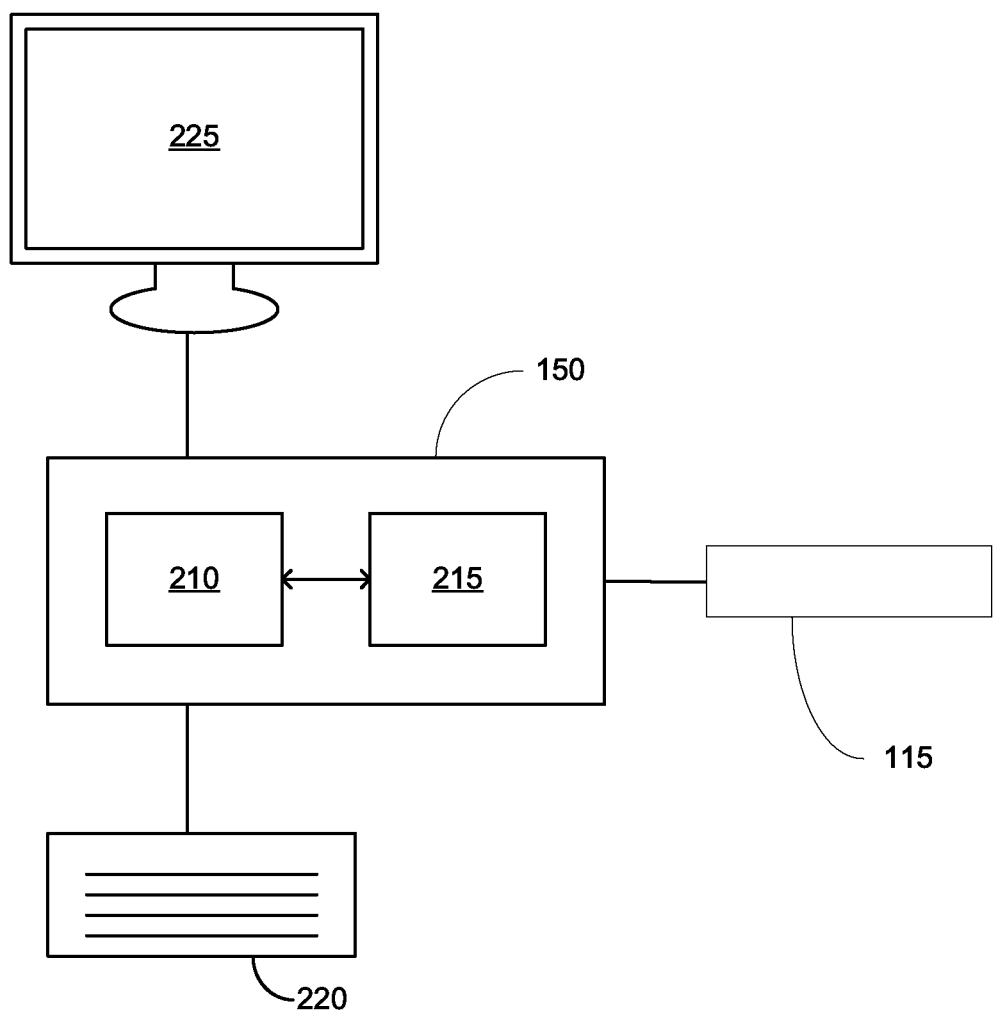
FIG. 2 is a block diagram of the system of FIG. 1 for estimating a distance between an acoustic sensor and an acoustic reflector in a conduit.

Referring to FIG. 2, the processing unit 150 includes a processor 210 and a non-transitory computer readable medium 215 that are communicatively coupled to each other. An input device 220 and a display 225 interact with the processor 210. The computer readable medium 215 has stored on it program code to cause the processor 150 to perform any suitable processing methods to the output signal.

Although FIG. 1 shows the conduit 125 in a vertical position, the system 100 may be used to estimate a distance between acoustic sensors and acoustic reflectors in conduits oriented in any direction, including horizontal conduits and conduits at a grade between horizontal and vertical. For example, the conduit 125 may be a vertical or horizontal pipe or wellbore.

The acoustic source 130 may be any source that produces sound that propagates along the conduit 125, including a migration of fluid across a casing that produces originating acoustic signals 135 that propagate along the conduit 125. The originating acoustic signals 135 resulting from the migration of fluid across a casing may be used as an identifier, or diagnostic, of a leaking wellbore. As an example, the gas may migrate as a bubble from the source up towards the surface, frequently taking a convoluted path that may progress into and/or out of the production casing, surrounding earth strata and cement casing of the wellbore, and may exit into the atmosphere through a vent in the wellbore, or through the ground. Fluid migration, including bubble movement, may produce an acoustic signal of varying frequency and amplitude, with a portion in the range of 20-20,000 Hz. In some cases, the acoustic signal may be continuous for about 1 ms or more.

In some embodiments, the acoustic source 130 may include sources introduced for the purpose of producing signals for analysis. Any suitable method of creating an acoustic signal 135 to propagate through the conduit 125 may be used. For example, a speaker may be used to create an acoustic signal. A recording of a sound may be played to cause a signal to propagate through the conduit 125. As another example, the outside of a conduit 125, such as a sidewall of a pipeline, or the surface casing of a well, might be struck to create an acoustic signal 135 inside the conduit 125. The pipe may be struck with, for example, a hammer.

In some embodiments, the acoustic signal 135 in the conduit 125 may be generated by an acoustic source 130 external to the conduit 125. The source 130 may be located off to a side of the conduit 125 so that the acoustic signal enters the conduit through a wall of the conduit 125. In certain embodiments, the acoustic source 130 may be located off of an end of the conduit 125. For example, the acoustic source 130 may be located above a well bore. The acoustic signal 135 produced by an external acoustic source 130 may propagate past the acoustic sensor 115 to the acoustic reflector 120 to produce an echo signal 140 such that the acoustic signal 135 as detected by the acoustic sensor 115, or a copy of the acoustic signal 135, may be combined with the echo signal 140 detected at the acoustic sensor 115 to produce a combined acoustic signal. In some embodiments, the originating acoustic signal 135 may itself be an echo of another acoustic signal.

The acoustic reflector 120 may be, for example, the bottom of a wellbore or a plug in the wellbore. Other objects along a wellbore or pipeline, such as blockages including sand or wax buildup, a fluid interface, or a surface casing shoe might also act as an acoustic reflector. For the case of a surface casing shoe or a fluid interface above the acoustic sensor 115, the originating acoustic signal 135 will propagate from below the acoustic sensor 115 to the acoustic reflector 120 above the acoustic sensor 115.

Figure 3:
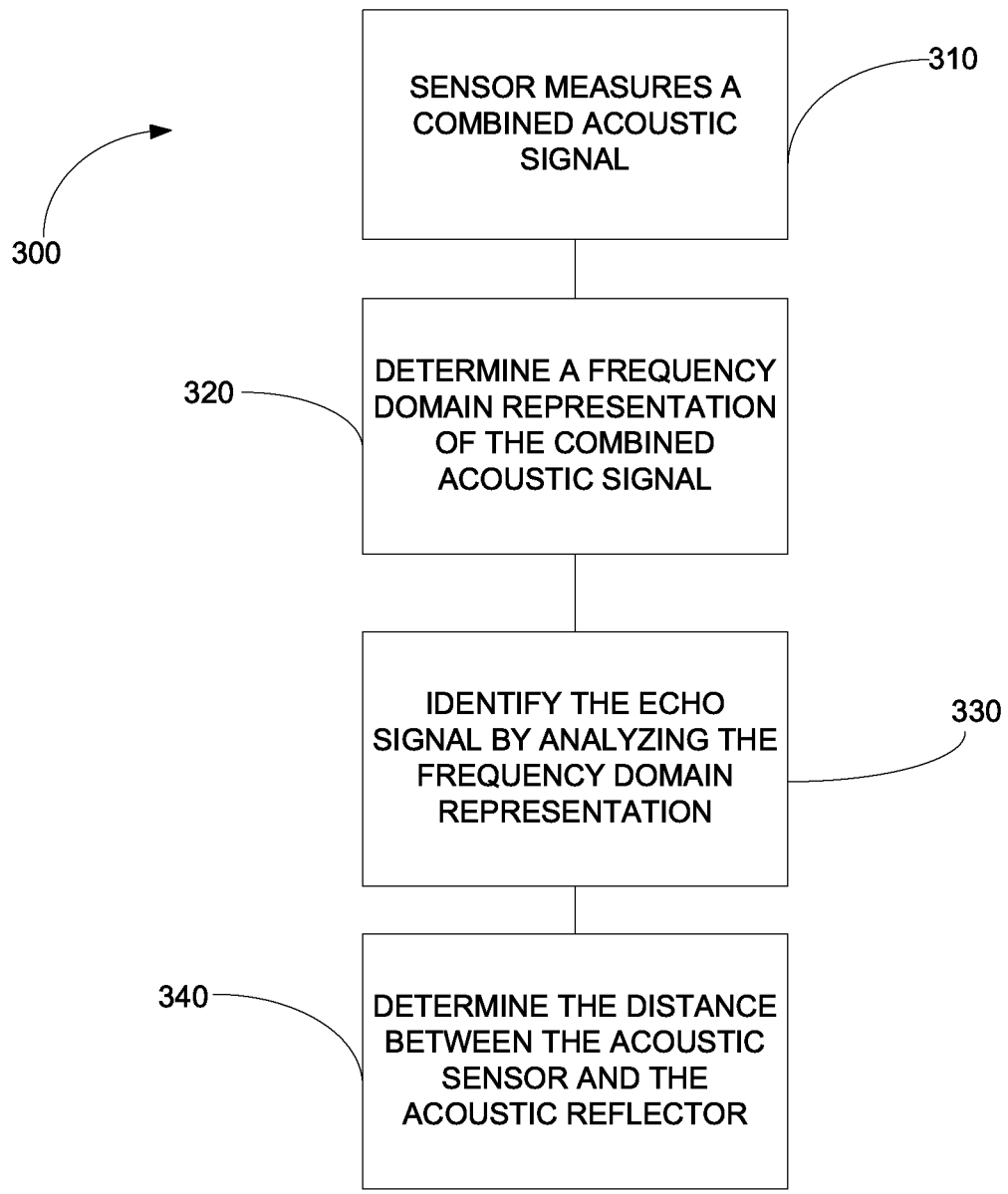
FIG. 3 is a method for estimating a distance between an acoustic sensor and an acoustic reflector in a conduit, according to another embodiment.

Referring to FIG. 3, a method 300 for estimating the distance 110 between the acoustic sensor 115 and the acoustic reflector 120 is shown. Block 310 involves using the acoustic sensor 115 to measure the combined acoustic signal. The combined acoustic signal comprises the originating acoustic signal 135 and an echo signal 140, where the echo signal 140 is generated by the originating acoustic signal 135 reflecting off of the acoustic reflector 120.

Referring again to FIG. 1, the originating acoustic signal 135 is sensed at the acoustic sensor 115 when it arrives at the acoustic sensor 115 at time t. The originating acoustic signal 135 continues on to the acoustic reflector 120 and is reflected as the echo signal 140. When the echo signal 140 reaches the acoustic sensor 115, the acoustic sensor 115 measures a combined acoustic signal that is created by the interference at the acoustic sensor 115 of the echo signal 140 and the originating acoustic signal 135 being generated by the acoustic source 130. There is a time delay between when the originating acoustic signal 135 is first measured and when the echo signal 140 arrives at the acoustic sensor 115. The time delay is the sum of the time it takes for the originating acoustic signal 135 to propagate from the acoustic sensor 115 to the acoustic reflector 120 and the time it takes for the echo signal 140 to travel from the acoustic reflector 120 to the acoustic sensor 115. The time delay corresponds to the phase difference between corresponding sound waves in the echo signal 140 and in the originating acoustic signal 135. When the echo signal 140 arrives at the acoustic sensor 115, it combines with the originating acoustic signal 135 incident at the acoustic sensor 115, forming an interference wave. Components of the echo signal 140 that have frequencies with a period that the time delay is a multiple of are amplified due to constructive interference, resulting in peaks in the frequency response of the combined acoustic signal.

In some cases, the originating acoustic signal 135 may be intermittent and may not be present at the acoustic sensor 115 when the echo signal 140 arrives at the acoustic sensor 115. The echo signal 140 may be combined with a copy of the originating acoustic signal 135 originally detected to form the combined acoustic signal.

It is to be understood that the echo signal 140 may include multiple reflections of the same acoustic event. For example, the originating acoustic signal 135 may travel past the acoustic sensor 115 a first time and hit the acoustic reflector 120. The echo signal 140 may reflect back, travel past the acoustic sensor 115 a second time, and hit another reflective source above the acoustic sensor 115. The other reflective source may be a fluid interface. The echo signal 140 may then reflect back again and travel past the acoustic sensor 115 a third time. This process may continue such that the echo signal 140 includes multiple reflections of the same acoustic event, wherein the time of each reflection is different. Also, the echo signal 140 attenuates each time it is reflected.

Block 320 of FIG. 3 involves determining the frequency domain representation of the combined acoustic signal. A frequency domain representation, or a frequency response, of a signal may be determined through a Fourier Transform of the signal. The transformation to the frequency domain representation is performed by the processing unit 150. The following embodiment utilizes a frequency-domain analysis for estimating the distance 110 between the acoustic sensor 115 and the acoustic reflector 120. However, it is noted that an alternative embodiment described below utilizes a time-domain analysis involving auto-correlation to estimate the distance 110. In the alternative embodiment, no frequency-domain analysis need be performed. The embodiment utilizing a frequency-domain analysis will now be described in detail.

For a simplified example of determining the frequency domain representation of an acoustic signal using a Fourier Transform, assume that the echo signal 140 is a scaled and delayed version of the originating acoustic signal 135. The combined acoustic signal may then be represented mathematically, in a simplified form without filters, as:

$$y(t) = u(t) + \underbrace{au(t-h)}_{\text{First Echo}} + \underbrace{a^2u(t-2h)}_{\text{Second Echo}} \ldots$$

where y(t) is the measured combined acoustic signal as a function of time; t is the time; u(t) is the originating acoustic signal as a function of time; a is a scaling factor; and h is the time delay between the originating acoustic signal 135 and the echo signal 140.

The Fourier Transform of the combined acoustic signal is then:

$$Y(e^{j\omega}) = U(e^{j\omega}) + ae^{-j\omega h}U(e^{j\omega}) + a^2 e^{-j\omega 2h}U(e^{j\omega}) + \cdots$$

$$= (1 + ae^{-j\omega h} + a^2 e^{-j\omega 2h} + \cdots)U(e^{j\omega})$$

The originating acoustic signal 135 is filtered by:

$$H(e^{j\omega}) = (1 + ae^{-j\omega h} + a^2 e^{-j\omega 2h} + \ldots)U(e^{j\omega})$$

The magnitude response of the filter $H(e^{j\omega})$ is:

$$|H(e^{j\omega})|^2 = \frac{1}{1 + a^2 + 2a\cos(\omega h)}$$

Figure 4:
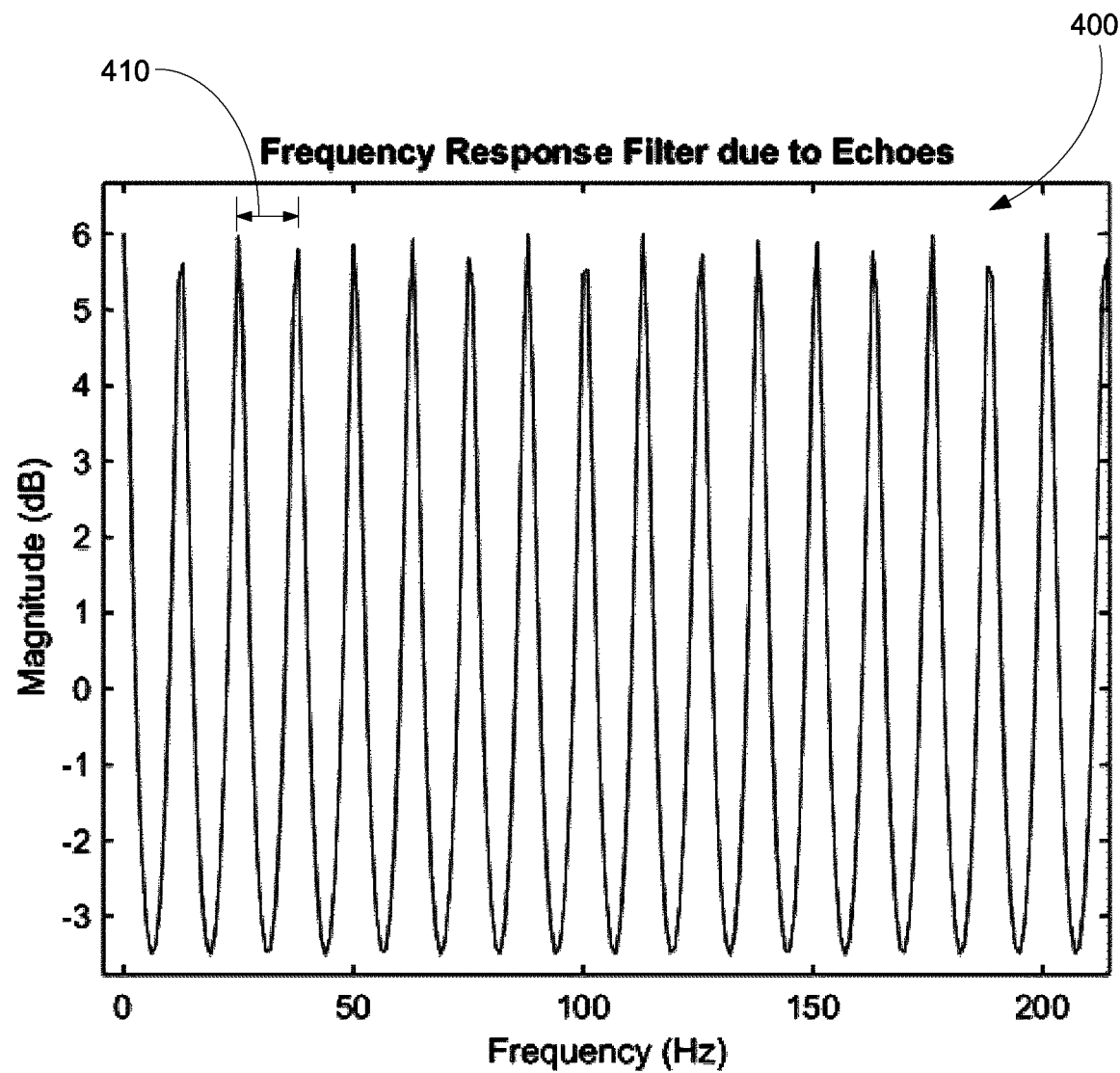
FIG. 4 is a graph of a frequency domain response of a simplified combined acoustic signal.

As seen in FIG. 4, the frequency response 400 has a periodic component with a peak-to-peak difference 410 of 1/h Hz. The peak-to-peak difference 410 1/h is much smaller than system dynamics and may generally range from about 1 Hz to about 300 Hz.

In a physical system, such as a wellbore, the echo signal 140 may be approximated as a scaled, delayed and filtered version of the originating acoustic signal 135. The combined acoustic signal then is:

$$y(t) = u(t) + aF(q)u(t-h) + a^2 F^2(q)u(t-2h) \ldots$$

where F(q) is a filtering function. F(q) may be modeled as, for example, a 2-pole low pass filter.

The Fourier Transform of y(t) is:

$$Y(e^{j\omega}) = U(e^{j\omega}) + ae^{-j\omega h}F(e^{j\omega})U(e^{j\omega}) + a^2 e^{-j\omega 2h}F^2(e^{j\omega})U(e^{j\omega}) + \cdots$$

$$= (1 + ae^{-j\omega h}F(e^{j\omega}) + a^2 e^{-j\omega 2h}F^2(e^{j\omega}) + \cdots)U(e^{j\omega})$$

The filter applied to the originating acoustic signal 135 due to the echo signal 140 is:

$$H(e^{j\omega}) = \frac{1}{1 + F(e^{j\omega})e^{-j\omega h}}$$

Figure 5A:
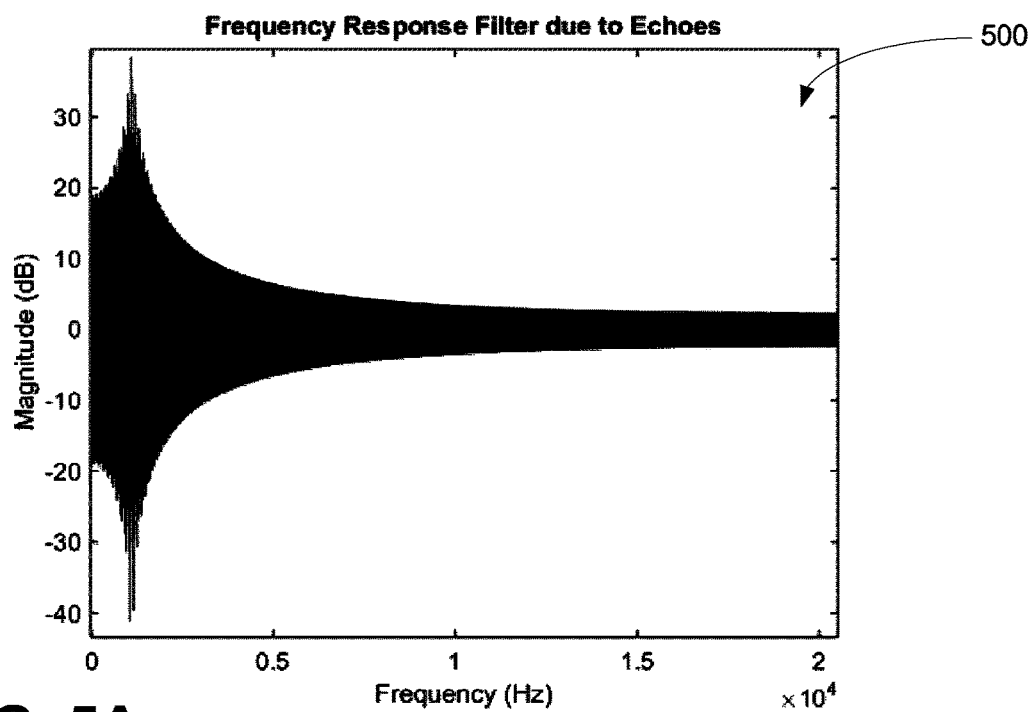
FIGS. 5A and 5B are graphs of a frequency domain response of a filtered combined acoustic signal.
Figure 5B:
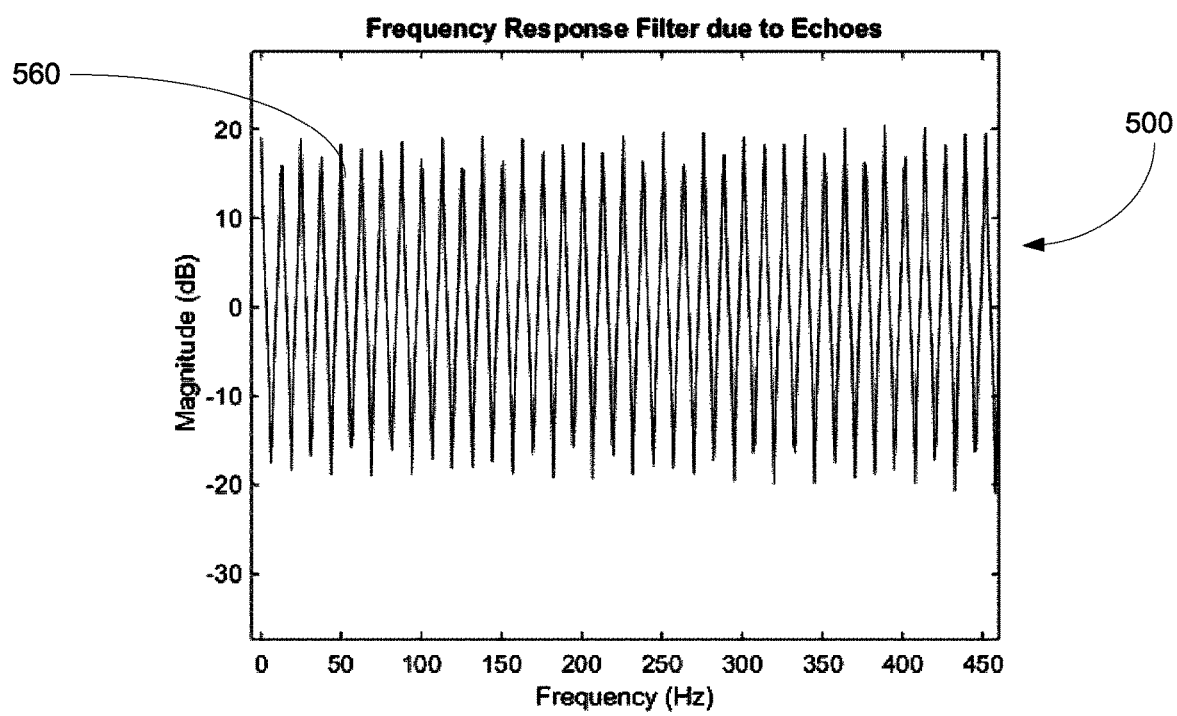

Similar to the simplified case, the magnitude response of $H(e^{j\omega})$ contains periodic oscillations that are periodic with a period (peak-to-peak difference) of about 1/h Hz. FIG. 5A shows a frequency response 500 for the filtered case where $$F(e^{j\omega}) = \frac{1}{1 - 0.8e^{-j\omega}}$$

and h=13.65 m/343 m/s for a frequency range from 0 to 20,000 Hz. FIG. 5B shows the same frequency response for a frequency range from 0 to 450 Hz with periodic oscillations 560 having a peak-to-peak difference 410 of about 1/h Hz.

The peak-to-peak difference 410 of the periodic oscillations 560 in the frequency response is inversely proportional to the time delay between the originating acoustic signal 135 and the echo signal 140:

$$h = \frac{1}{f_{p2p}}$$

where $f_{p2p}$ is the peak to peak difference 410 of the periodic oscillations 560.

As seen in FIGS. 4, 5A, and 5B, the interference of acoustic reflections, such as the echo signal 140, with the originating acoustic signal 135 results in periodic oscillations 560 in the frequency domain representation. Referring to FIG. 3, block 310 involves, identifying the echo signal 140 by analyzing the frequency domain representation, wherein the analyzing comprises identifying in the frequency domain representation periodic oscillations 560 having a peak-to-peak difference 410 between 0.75 Hz and 1500 Hz The analysis is performed by the processing unit 150. An average or mean of the peak-to-peak difference may be determined for all of periodic oscillations 560. Alternatively, an average or mean peak-to-peak difference may be determined using a subset of period oscillations 560 wherein the subset includes any desired number periodic oscillations 560. Similarly, an average or mean value of the time delay may be determined by taking the inverse of an average or mean peak-to-peak difference or by taking the mean value of a set of time delay values, where each time delay value is individually obtained.

Block 340 involves determining the distance 110 between the acoustic sensor 115 and the acoustic reflector 120 from the velocity of the echo signal 140 as it propagates between the acoustic sensor 115 and the acoustic reflector 120 and the time required for the echo signal 140 to propagate between the acoustic sensor 115 and the acoustic reflector 120. In this embodiment, the time required for the echo signal 140 to propagate between the acoustic reflector 120 and the sensor reflector 115 is about half of the time delay between the originating acoustic signal 135 and the echo signal 140. The processing unit 150 determines the distance 110 as described below.

The distance between the acoustic sensor 115 and the acoustic reflector 120 is inversely proportional to the time delay between the originating acoustic signal 135 and the echo signal 140:

$$d = v \times h/2$$

where d is the distance 110 between the acoustic sensor 115 and the acoustic reflector 120; v is the velocity of sound; and h is the time delay between the originating acoustic signal 135 and the echo signal 140.

In some embodiments, the time delay between the originating acoustic signal 135 and the echo signal 140 is determined by measuring the time between an initial detection of the originating acoustic signal 135 and an initial detection of the combined acoustic signal, as marked by the appearance of the periodic oscillations 560.

In certain embodiments the time delay between the originating acoustic signal 135 and the echo signal 140 is determined by determining an inverse of the average peakto-peak difference 410 of the periodic oscillations 560 on the frequency domain representation of the combined acoustic signal.

A distance from a first end of the conduit 125 to the acoustic reflector 120 may be estimated by adding the estimate of the distance 110 between the acoustic reflector 120 and the acoustic sensor 115 to the known distance between the first end of the conduit 125 and the acoustic sensor 115. For example, the distance from the top of a wellbore to a plug may be estimated by first estimating the distance 110 between the plug and an acoustic sensor 115 using the methods described above and then adding the estimate of the distance between the plug and the sensor 115 to a known depth of the sensor 115.

The velocity of the echo signal 140 in the conduit 125 is the velocity of sound in the conduit 125. The velocity of sound in the conduit 125 may be known from material properties of the fluid in the conduit 125. In some situations, the velocity of sound in the conduit 125 may be unknown. The velocity of sound may be estimated by taking measurements at multiple acoustic sensors 115 in the conduit 125. For example, in one embodiment, the velocity of sound is estimated in a wellbore by measuring a difference in detection time of an acoustic signal as it propagates between known locations of a first and a second acoustic sensor 115.

The velocity of sound in a conduit 125, such as a wellbore, may also be estimated by receiving the combined acoustic signal at multiple acoustic sensors 115 spaced apart along the wellbore at known intervals (not shown). A frequency domain representation of the combined acoustic signal at each of the multiple acoustic sensors 115 shows the echo signal 140 as measured at each location. A peak-to-peak difference 410 of periodic oscillations 560 for each of the frequency domain representations may be determined, allowing a determination of the time delay between the echo signal 140 and the originating acoustic signal 135 at each acoustic sensor 115 by inverting the peak-to-peak difference 410. The velocity of sound in the conduit 125 is then estimated by using the difference in depth measurements of the acoustic sensors 115:

$$v = 2\Delta d / \Delta h$$

where v is the velocity of sound in the conduit 125, $\Delta d$ is the distance between acoustic sensors 115, and $\Delta h$ is the difference in the time delay between the echo signal 140 and the originating acoustic signal 135 at each of the two acoustic sensors 115 used in the measurement. In some embodiments, a single acoustic sensor 115 may be moved to different locations to record the combined signal rather than using multiple acoustic sensors 115. In certain embodiments, a distributed acoustic sensor 115 may be used to take measurements at different locations. A distributed sensor may be used to make simultaneous measurements at different locations.

Multiple measurements may be made with different pairs of acoustic sensors 115 and the results used to determine an average estimated velocity of sound. In some embodiments, multiple measurements may be made using a single acoustic sensor 115 by moving the acoustic sensor 115 to different locations. The results may then be used to determine an average estimated velocity of sound.

In certain embodiments (not shown), the velocity of the echo signal 140 as it propagates between the acoustic reflector 120 and the acoustic sensor 115 is estimated from delay times between the originating acoustic signal 135 and the echo signal 140 at additional acoustic sensors 115 spaced apart along the conduit 125 and the distance between the additional acoustic sensors 115.

Referring to FIG. 1, the acoustic sensor 115 is used to measure the combined acoustic signal. In one embodiment, the acoustic sensor 115 is a fiber optic sensor. For example, the acoustic sensor 115 may be a fiber optic sensor array as are known in the art, for example, but not limited to Hifi Engineering Inc.'s MiQro™ (aka LeakSonar™ sensory technology). In another embodiment, the acoustic sensor 115 is a fiber optic sensor comprising fiber Bragg gratings ("FBGs"), such as the sensor 610 shown in FIG. 6. Any number of acoustic sensors 115 may be positioned on the deployment line 160. The acoustic sensor 115 may be an optical fiber deployed downhole in a wireline consisting of a metal or plastic tube surrounding the optical fiber to protect the fiber. Alternatively, any suitable acoustic sensors as are known in the art, including microphones, may be utilized.

Optical fibers used as acoustic sensors generally comprise one or more fiber optic strands, each of which is made from quartz glass (amorphous $SiO_2$). The fiber optic strands are doped with various elements and compounds (including germanium, praseodymium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend-insensitive), SMF28 series single mode fibers such as SMF-28 ULL fiber or SMF-28e fiber, and InfiniCor® series multimode fibers.

Fiber optic acoustic sensors may generally use optical interferometry to detect acoustic events. Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. Optical interferometry has a variety of applications, one of which is being used to detect dynamic strain.

When an acoustic event occurs downhole in a wellbore at any point along an optical fiber, a segment of the fiber experiences dynamic strain, and the optical path change along the segment varies directly with the magnitude of that dynamic strain. Any changes to the optical path length of the fiber segment result in a corresponding phase difference between the reflected reference and sensing pulses. Since the two reflected pulses are received as one combined interference pulse, the phase difference between them is embedded in the combined signal. This phase information can be extracted using proper signal processing techniques, such as phase demodulation. The relationship between the optical path of the fiber segment and that phase difference ($\theta$) is as follows:

$$\theta = \frac{2\pi n L}{\lambda}$$

where n is the index of refraction of the optical fiber; L is the physical path length of the fiber segment; and $\lambda$ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time.

Figure 6:
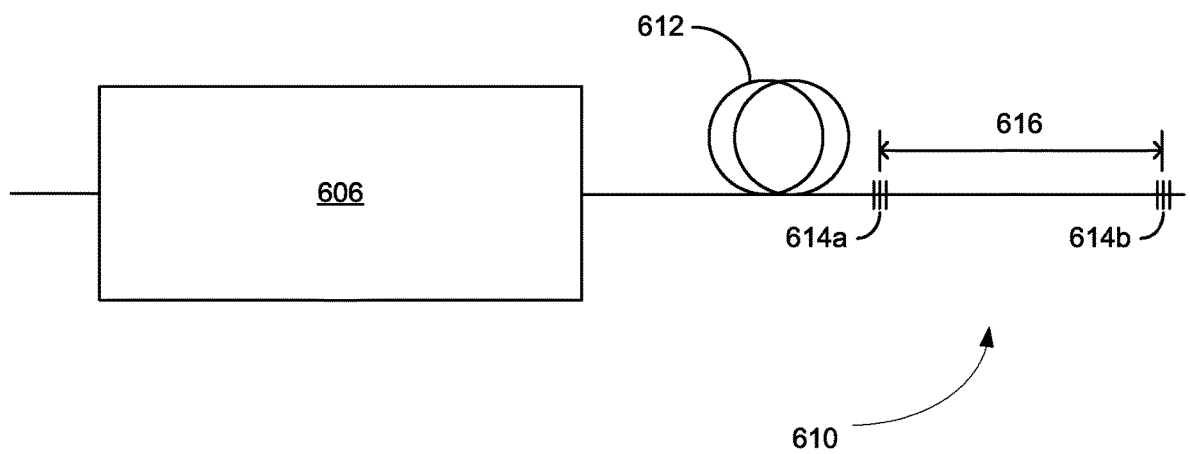
FIG. 6 is a schematic that depicts how a light pulse interacts with impurities in an optical fiber that results in scattered laser light due to Rayleigh scattering, which is used for distributed acoustic sensing ("DAS")

Referring now to FIG. 6, there is shown one embodiment of an acoustic sensor 610 comprising an optical fiber 612 comprising FBGs for performing fiber Bragg grating based interferometry.

An interrogator 606 optically coupled to the optical fiber 612 generates sensing and reference pulses and outputs the reference pulse after the sensing pulse. The pulses are transmitted along optical fiber 612 that comprises a first pair of FBGs. The first pair of FBGs comprises first and second FBGs 614a,b (generally, "FBGs 614"). The first and second FBGs 614a,b are separated by a certain segment 616 of the optical fiber 612 ("fiber segment 616"). The optical length of the fiber segment 616 varies in response to dynamic strain that the fiber segment 616 experiences.

The light pulses have a wavelength identical or very close to the center wavelength of the FBGs 614, which is the wavelength of light the FBGs 614 are designed to partially reflect; for example, typical FBGs 614 are tuned to reflect light in the 1,000 to 2,000 nm wavelength range. The sensing and reference pulses are accordingly each partially reflected by the FBGs 614a,b and return to the interrogator 606. The delay between transmission of the sensing and reference pulses is such that the reference pulse that reflects off the first FBG 614a (hereinafter the "reflected reference pulse") arrives at an optical receiver simultaneously with the sensing pulse that reflects off the second FBG 614b (hereinafter the "reflected sensing pulse"), which permits optical interference to occur.

While FIG. 6 shows only the one pair of FBGs 614a,b, in alternative embodiments (not depicted) any number of FBGs 614 may be on the fiber 612, and time division multiplexing techniques (TDM) (and optionally, wavelength division multiplexing (WDM)) may be used to simultaneously obtain measurements from them.

The interrogator 606 emits laser light with a wavelength selected to be identical or sufficiently near the center wavelength of the FBGs 614 that each of the FBGs 614 partially reflects the light back towards the interrogator 606. The timing of the successively transmitted light pulses is such that the light pulses reflected by the first and second FBGs 614a,b interfere with each other at the interrogator 606, which records the resulting interference signal. The strain that the fiber segment 616 experiences alters the optical path length between the two FBGs 614 and thus causes a phase difference to arise between the two interfering pulses. The resultant optical power at the optical receiver can be used to determine this phase difference. Consequently, the interference signal that the interrogator 606 receives varies with the strain the fiber segment 616 is experiencing, which allows the interrogator 706 to estimate the strain the fiber segment 616 experiences from the received optical power.

Figure 7:
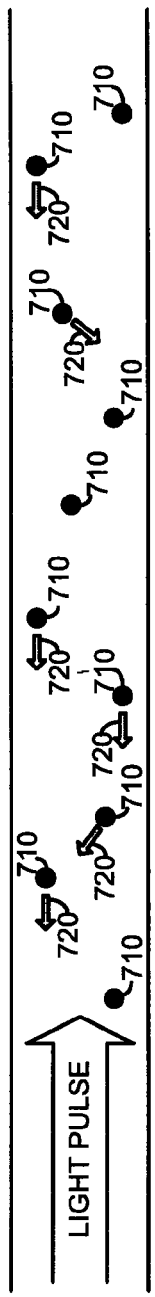
FIG. 7 shows an acoustic sensor that includes fiber Bragg gratings for reflecting a light pulse.

FIG. 7 shows an alternative embodiment for determining Δ nL using what is broadly referred to as distributed acoustic sensing ("DAS"). DAS involves laying the fiber through or near a region of interest and then sending a coherent laser pulse along the fiber. As shown in FIG. 7, the laser pulse interacts with impurities 710 in the fiber 705, which results in scattered laser light 720 because of Rayleigh scattering. Vibration or acoustics emanating from the region of interest results in a certain length of the fiber becoming strained, and the optical path change along that length varies directly with the magnitude of that strain. Some of the scattered laser light 720 is back scattered along the fiber 705 and is directed towards an optical receiver (not shown), and depending on the amount of time required for the scattered light 720 to reach the receiver and the phase of the scattered light 720 as determined at the receiver, the location and magnitude of the vibration or acoustics can be estimated with respect to time. DAS relies on interferometry using the reflected light to estimate the strain the fiber experiences. A series of locations along the optical fibre 705, and thus along the wellbore, can be monitored simultaneously using TDM (and optionally, WDM).

Experimental Results

Figure 8A:
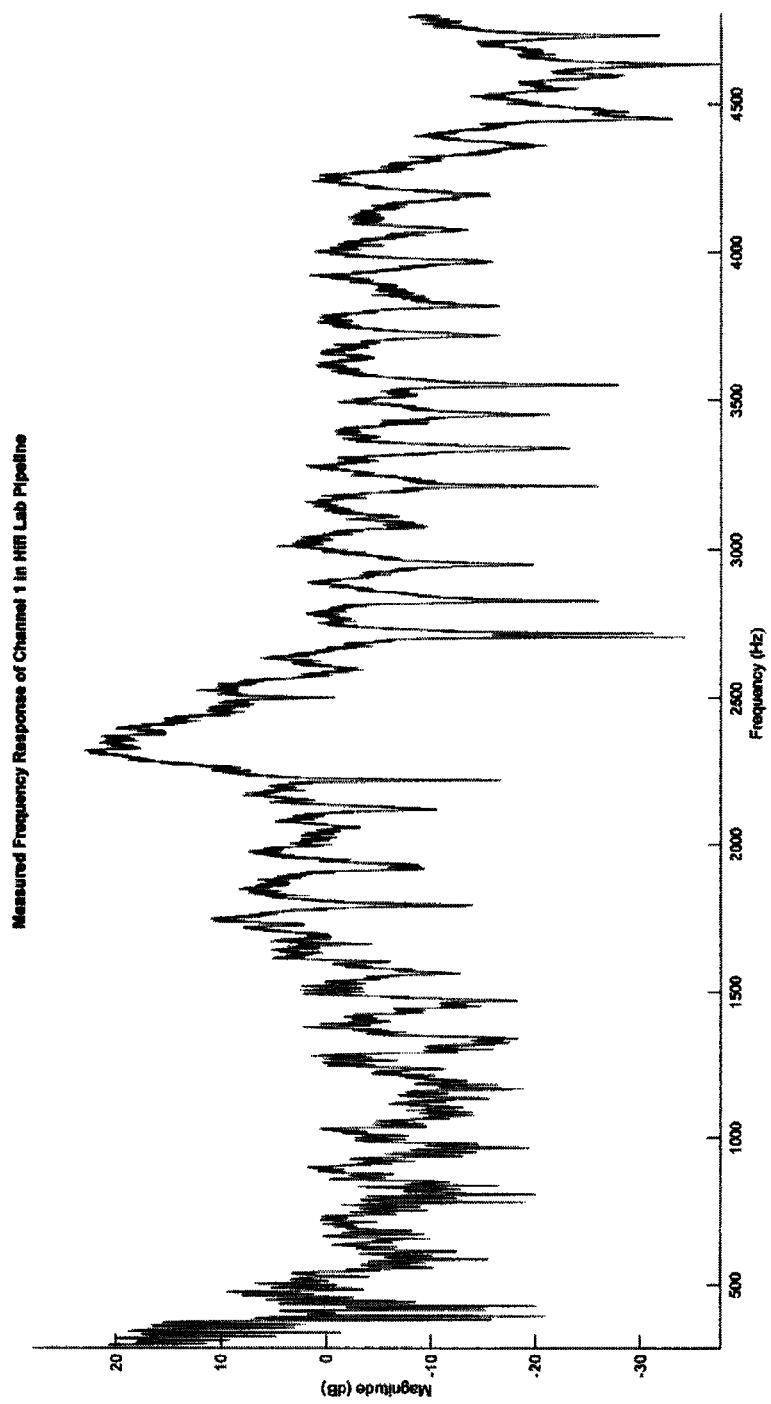
FIGS. 8A and 8B are graphs of experimental results from a pipe for a system for estimating a distance between an acoustic sensor and an acoustic reflector in a conduit.

Referring to FIG. 8A, a measured frequency response is shown for a combined acoustic signal in a 13.6 m pipeline filled with air. Using 343 m/s as the velocity of sound in air and the length of the pipe as the distance between the acoustic sensor 115 and the acoustic reflector 120, the time delay h is calculated as h=13.6 m×2/343 m/s=0.793 s. Taking the inverse provides a peak-to-peak difference 410 of 12.6 Hz.

Figure 8B:
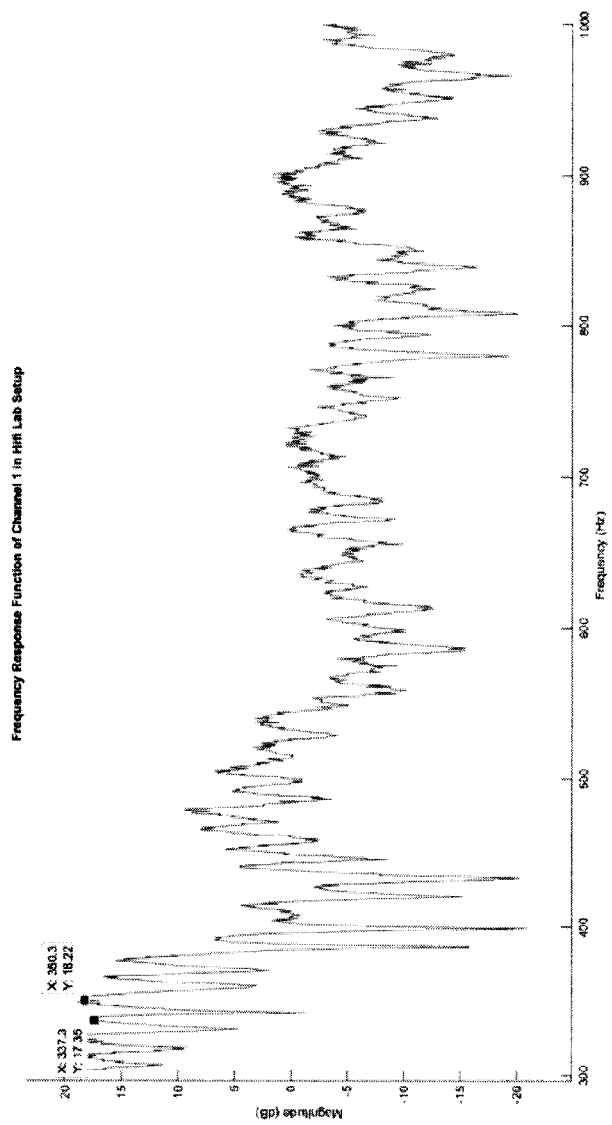

FIG. 8B shows an enlarged portion of the frequency response of FIG. 8A. The average peak-to-peak difference 410 is found to be 12.92 Hz, which corresponds to a reflection distance of 13.27 m.

Figure 9:
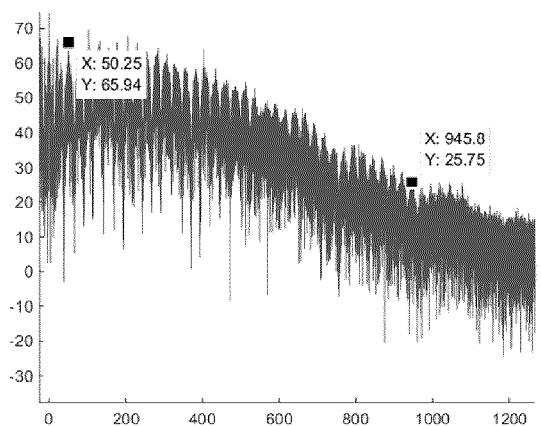
FIG. 9 shows graphs of experimental results from a wellbore for a system for estimating a distance between an acoustic sensor and an acoustic reflector in a conduit.
Figure 9:
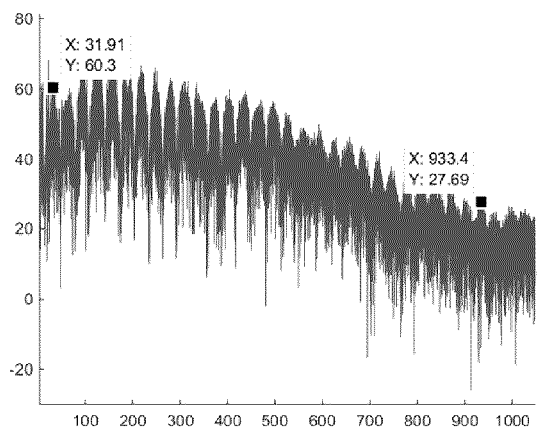
Figure 9:
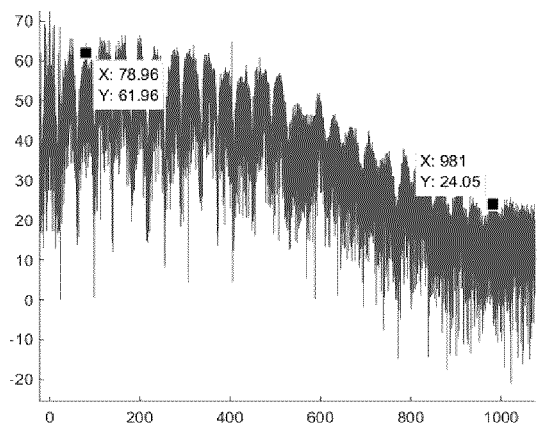

FIG. 9 shows frequency response functions obtained using a MiQro™ tool for three different depths of a wellbore. The peak-to-peak difference for each graph and the corresponding time delays are shown in Table 1. Using v=2Δd/Δh, where Δd is the change in depth between measurement depths and Δh is the difference in time delay between measurement depths, the average speed of sound in the liquid in the measurement region was estimated to be 1475.3 m/s.

TABLE 1

| Depth (m) | Peak to Peak Difference (Hz) | Time Delay (ms) |
| --- | --- | --- |
| 1705 m | 25.61 Hz | 39.05 ms |
| 1710 m | 31.08 Hz | 32.17 ms |
| 1715 m | 39.22 Hz | 25.5 ms |

Using the average speed of sound as 1475.3 m/s, the distance to the plug from each of the measurement depths and the overall depth of the plug based on the measurement for each of the measurement depths was calculated, as shown in Table 2. Taking the mean of the plug depth values in Table 2, the depth of the plug was estimated to be 1733.77 m or about 1734 m, closely matching the actual known depth.

TABLE 2

| Depth (m) | Distance to plug (m) | Depth of plug (m) |
| --- | --- | --- |
| 1705 m | 28.81 | 1733.80 m |
| 1710 m | 23.73 | 1733.70 m |
| 1715 m | 18.81 | 1733.8 m |

Alternative Embodiments

In some embodiments, a time delay between an originating signal 135 and an echo signal 140 may be determined in the time domain using, for example, autocorrelation techniques. An autocorrelation of a signal u(t) may be represented as:

$$R_u(\tau) = \Sigma_{t=0}^{N-1} u(t) u(t-\tau)$$

where u(t) is the measured signal, t is time, τ is the lag time or time delay, and $R_u(\tau)$ is the autocorrelation of u(t) as a function of τ.

Figure 10:
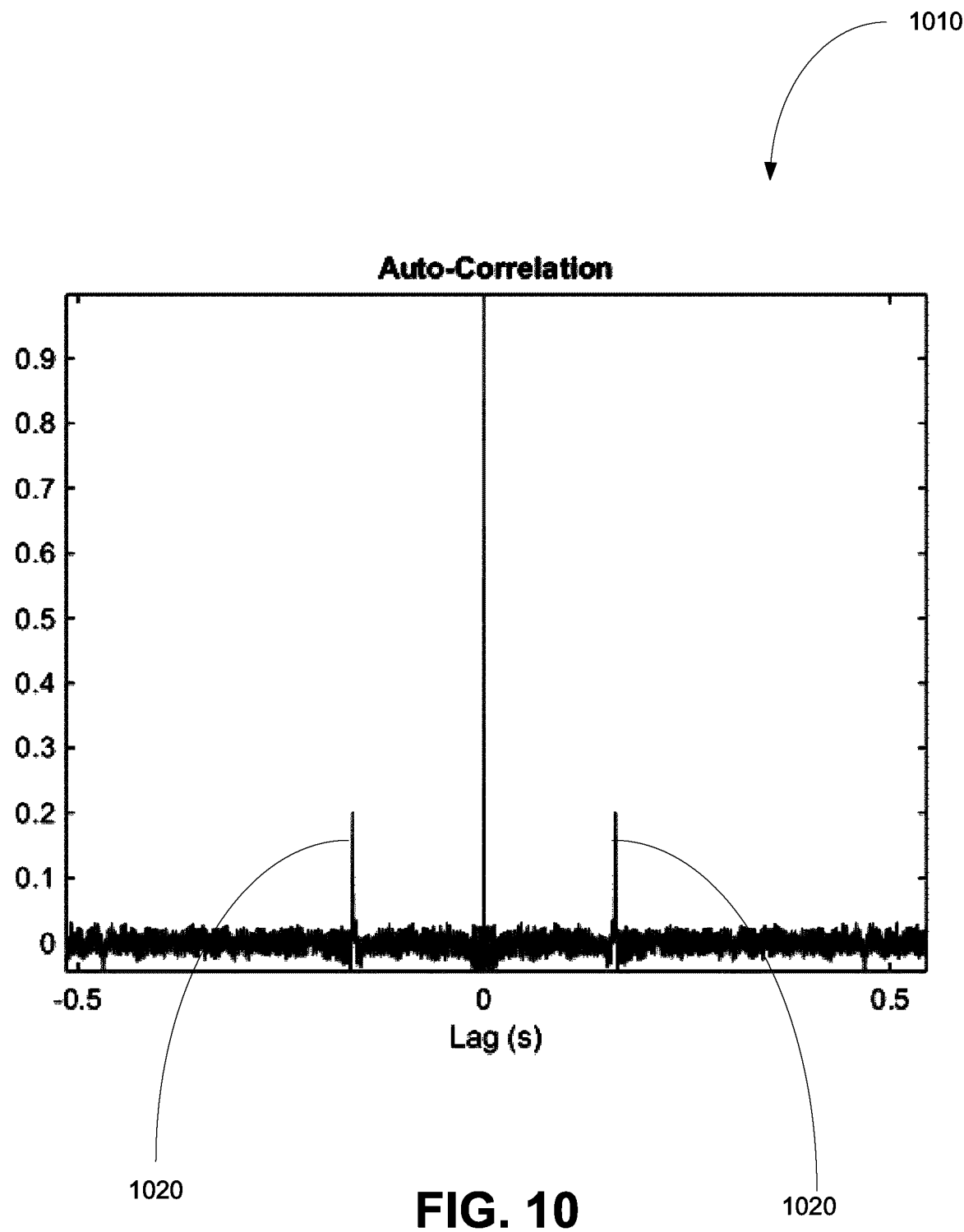
FIG. 10 shows a graph of an autocorrelation.

Referring to FIG. 10, a graph 1010 of the autocorrelation is shown. The autocorrelation may be normalized to 1 at τ=0. Reflections (echo signals 140) result in the combined signal being correlated to a past version of itself, creating peaks 1020 at τ>0.

In some embodiments, the delay time may be estimated by looking for peaks on the graph 1010 of the autocorrelation. In certain embodiments, a delay time may be estimated by finding a maximum of the autocorrelation.

In certain embodiments, a lag time between an originating acoustic signal 135 and an echo signal 140 in a conduit 125 may be determined by measuring at a first position a combined acoustic signal that comprises the originating acoustic signal 135 propagating along the conduit 125 and the echo signal 140, where the echo signal 140 is generated by the originating acoustic signal 135 reflecting off of an acoustic reflector 120 in the conduit 125 after propagating past the first position. An autocorrelation of the combined acoustic signal may be determined and the echo signal 140 by may be identified by identifying a peak at a time greater than zero, where the time greater than zero is the lag time. The distance between an acoustic sensor 130 located at the first position and the acoustic reflector 120 may be determined from a velocity of the echo signal 140 as it propagates between the acoustic sensor 130 and the acoustic reflector 120 and the lag time.

In some embodiments, the location of the acoustic reflector 120 may be determined by determining the lag time at multiple distances along the conduit 125, plotting the lag times against the distances and determining a y-intercept of the plot.

Figure 11:
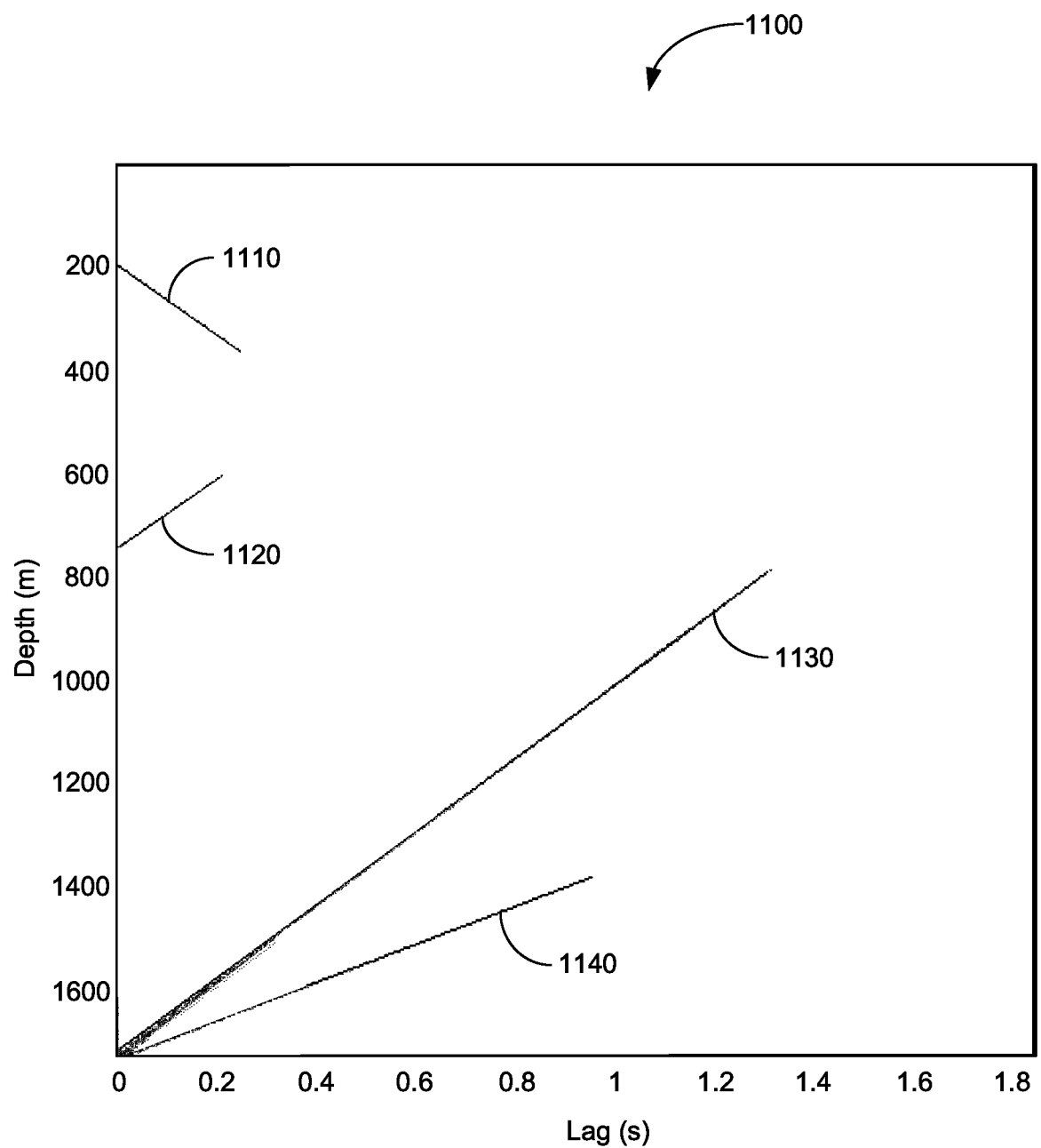
FIG. 11 shows a plot of lag time versus measurement depth.

Referring to FIG. 11, a plot 1100 showing autocorrelations for multiple acoustic reflection sources 120 estimated at different depths of a conduit 125 is shown. Plotting the autocorrelation for each depth that an acoustic measurement is made at in a single plot may facilitate determining whether echo signals 140 are propagating from the bottom of the conduit 125, the top of the conduit 125, or somewhere in the middle. Each line on the plot 1100, referred to hereafter as a reflection line, represents a set of autocorrelations for an echo signal 140, with each autocorrelation in the set being determined at a different measurement depth. Each reflection line 1110-1140 is due to echo signals 140 generated by an acoustic reflector 120 at a different depth than an acoustic reflector 120 responsible for generating the echo signals 140 of the other reflection lines or due to an echo signal 140 propagating through a different medium than the echo signals 140 of the other reflection lines.

The y-intercept for each of the reflection lines 1110-1140 indicates the depth of an acoustic reflector 120, which may suggest what the acoustic reflector 120 is. For example, the reflection line 1110 at the top of the plot 1100 represents echo signals 140 from a surface casing shoe at a depth of 200 m. The negative slope indicates that the acoustic sensor 130 was below the acoustic reflector 120. A second reflection line 1120 represents echo signals 140 from an acoustic reflector 120 at a depth of about 750 m. A third reflection line 1130 represents echo signals 140 originating from the plug at the bottom of the well at a depth of about 1700 m. The magnitude of the slopes of each of the reflection lines 1110-1140 may be used to find the speed of sound in the medium that the echo signal 140 is propagating through. Since the x-axis is measuring lag time, which is twice the time required for the echo signal 140 to travel from the acoustic reflector 120 to the acoustic sensor 130, dividing the change in depth by half the lag time gives the speed of sound. For the first three reflection lines 1110-1130, the speed of sound is calculated as approximately ±1450 m/s, which is about the speed of sound in water. The fourth reflection line 1140 represents echo signals 140 propagating through a medium with a speed of sound of about 750 m/s, meaning it is less dense than water. Like the echo signals 140 of the third reflection line 1130, the echo signals 140 represented by the reflection line 1140 are originating from the plug at the bottom of the well, at a depth of about 1700 m. They are, however, propagating through a different medium than the echo signals 140 represented by the reflection line 1130.

Figure 12A:
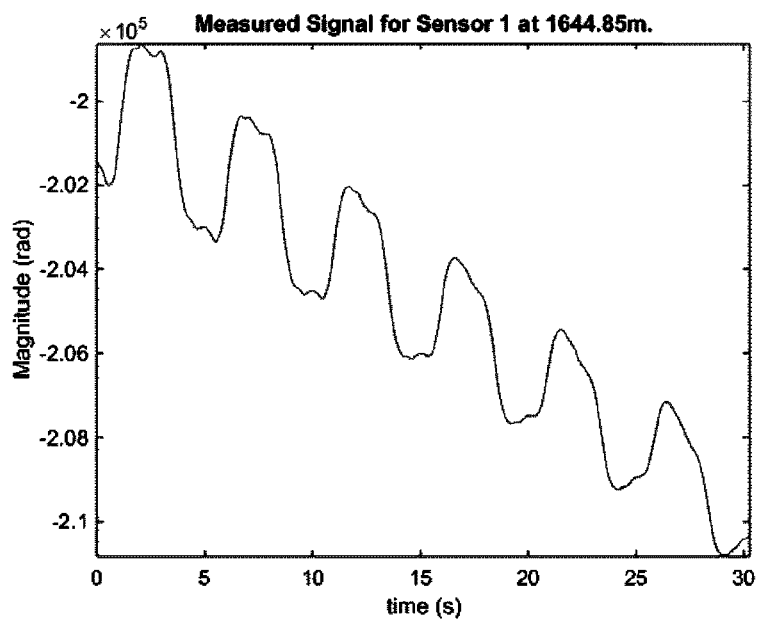
FIGS. 12A-12D show graphs used in determining the plot of FIG. 11.
Figure 12B:
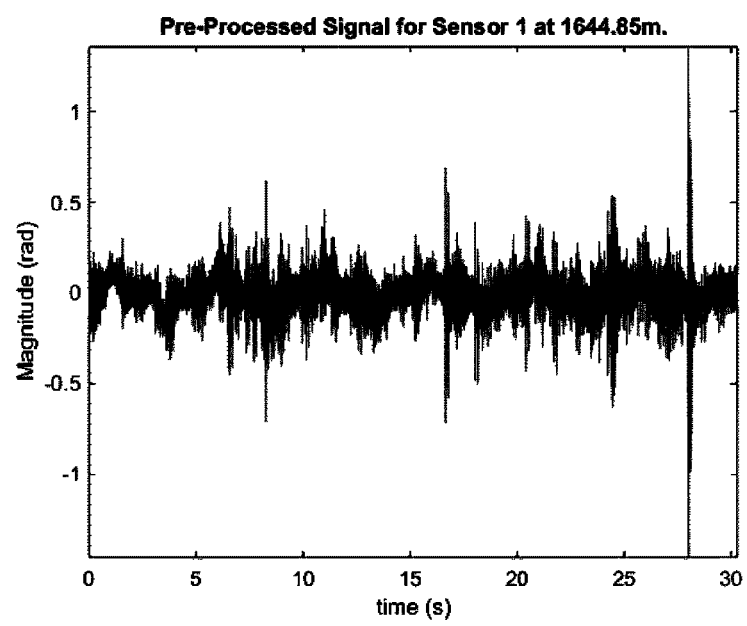

A plot such as the plot 1100 of FIG. 11 may be made by determining an autocorrelation estimate for different measurement depths. For each estimate, the acoustic data may first be preprocessed to remove excessive machinery noise if present and to filter the data. For example, a high-pass filter may be used to preprocess the acoustic data. Referring to FIG. 12A, an acoustic signal obtained from an acoustic sensor in a well at a depth of 1644.85 meters is shown. The preprocessed data is shown in FIG. 12B. High-pass filtering has been used to remove the trends.

Next, each measurement may be split into multiple segments. For example, in some embodiments, a 38 s measurement may be split into segments between about 0.5-5 s. Polynomial detrending may then be used on each segment. In certain embodiments, polynomials up to order 10 may be used. An autocorrelation may then be calculated for each of the segments. In some embodiments, a rectangular window is used to calculate an autocorrelation for a shorter period. For example, a rectangular window may be used to only calculate an autocorrelation for 0.3-3 s lag for each segment (for example, for each 0.5-5 s segment).

Figure 12C:
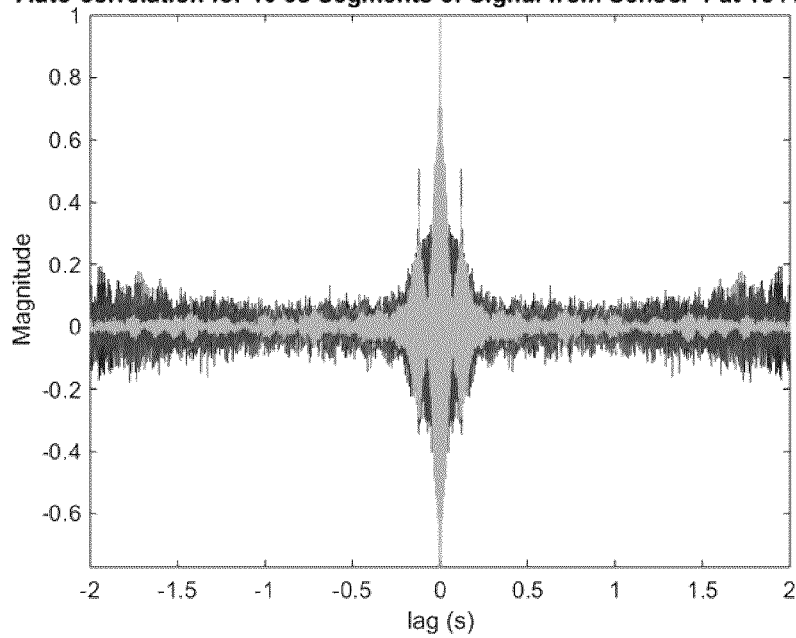
Figure 12D:
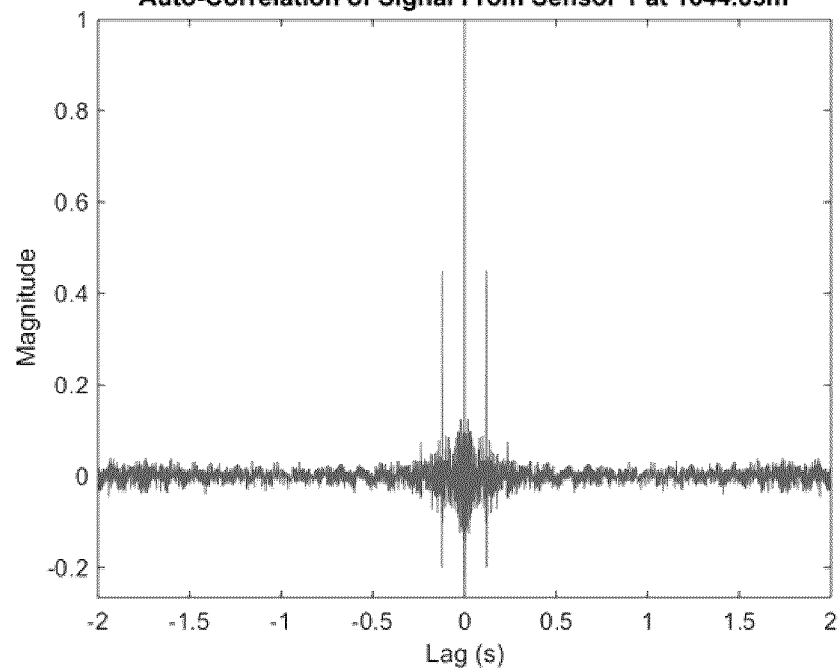

The autocorrelations may then be averaged to determine a final estimate of the autocorrelation. FIG. 12C shows ten estimates of the autocorrelations for ten 3 second segments of the signal of FIG. 12A overlaid on the same plot. FIG. 12D shows an average of the ten estimates. The sharp peaks at +/−0.1 seconds are due to echo signals 140 from the bottom of the well. If multiple echo signals 140 are present in the combined signal, each from an acoustic reflector 120 at a different distance, multiple pairs of peaks will be seen on the plot (not shown).

The plot 1100 of FIG. 11 is constructed by plotting the lag times (the time where the sharp peaks occur) versus depth for various depths.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for estimating a distance between an acoustic sensor and an acoustic reflector in a conduit, the method comprising:
   (a) measuring at the acoustic sensor a combined acoustic signal that comprises an originating acoustic signal propagating along the conduit and an echo signal, wherein the echo signal is generated by the originating acoustic signal reflecting off the acoustic reflector after propagating past the acoustic sensor;
   (b) determining a frequency domain representation of the combined acoustic signal;

(c) identifying the echo signal by analyzing the frequency domain representation, wherein the analyzing comprises identifying in the frequency domain representation periodic oscillations having a peak-to-peak difference between 0.75 Hz and 1500 Hz; and (d) determining the distance between the acoustic sensor and the acoustic reflector from the velocity of the echo signal as it propagates between the acoustic sensor and the acoustic reflector and a time required for the echo signal to propagate between the acoustic sensor and the acoustic reflector.

2. The method of claim 1 wherein the time required is estimated by determining an inverse of an average peak-to-peak distance of the periodic oscillations on the frequency domain representation of the combined acoustic signal and dividing the inverse by two.

3. The method of claim 1 wherein the time required is estimated by measuring the time between an initial detection of the originating acoustic signal and an initial detection of the combined acoustic signal, as marked by the appearance of the periodic oscillations and dividing the measured time by two.

4. The method of claim 1 wherein the distance between the acoustic sensor and the acoustic reflector is determined by using the equation d=v×h/2 wherein d is the distance between the acoustic sensor and the acoustic reflector, v is the velocity of sound in the conduit, and h is a time delay between the originating acoustic signal and the echo signal.

5. The method of claim 1 wherein the acoustic sensor comprises multiple sensors spaced apart along a length of the conduit.

6. The method of claim 1 wherein the velocity of the echo signal as it propagates between the acoustic reflector and the acoustic sensor is estimated from delay times between the originating acoustic signal and the echo signal at points spaced apart along the conduit and the distance between the points.

7. The method of claim 1 wherein the conduit is a wellbore.

8. The method of claim 1 wherein the conduit is a pipeline.

9. The method of claim 1 wherein the acoustic sensor is an optical fiber sensor comprising fiber Bragg gratings ("FBGs") for performing fiber Bragg grating based interferometry.

10. A system for estimating a distance between an acoustic sensor and an acoustic reflector in a conduit, the system comprising:
(a) the acoustic sensor for measuring a combined acoustic signal that comprises an originating acoustic signal and an echo signal, wherein the echo signal is generated by the originating acoustic signal reflecting off the acoustic reflector after propagating past the acoustic sensor, converting the combined acoustic signal to an output signal, and outputting the output signal to a processing unit, wherein the acoustic sensor is communicatively coupled to the processing unit;
(b) the processing unit for analyzing the output signal to:
(i) determine a frequency domain representation of the combined acoustic signal;
(ii) identify the echo signal by analyzing the frequency domain representation, wherein the analyzing comprises identifying in the frequency domain representation periodic oscillations having a peak-to-peak difference between 0.75 Hz and 1500 Hz; and
(iii) determine a distance between the acoustic sensor and the acoustic reflector from the velocity of the echo signal as it propagates between the acoustic sensor and the acoustic reflector and the time required for the echo signal to propagate between the acoustic sensor and the acoustic reflector.

11. The system of claim 10 wherein the acoustic sensor is an optical fiber sensor comprising fiber Bragg gratings ("FBGs") for performing fiber Bragg grating based interferometry.

12. The system of claim 10 wherein the acoustic sensor comprises multiple sensors spaced apart along a length of the conduit.

13. A non-transitory computer readable medium having stored thereon program code to cause a processor to perform a method for estimating a distance between an acoustic sensor and an acoustic reflector in a conduit, the method comprising:
(a) measuring at the acoustic sensor a combined acoustic signal that comprises an originating acoustic signal and an echo signal, wherein the echo signal is generated by the originating acoustic signal reflecting off the acoustic reflector after propagating past the acoustic sensor;
(b) determining a frequency domain representation of the combined acoustic signal;
(c) identifying the echo signal by analyzing the frequency domain representation, wherein the analyzing comprises identifying in the frequency domain representation periodic oscillations having a peak-to-peak difference between 0.75 Hz and 1500 Hz; and
(d) determining a distance between the acoustic sensor and the acoustic reflector from the velocity of the echo signal as it propagates between the acoustic sensor and the acoustic reflector and the time required for the echo signal to propagate between the acoustic sensor and the acoustic reflector.

14. A method for estimating a lag time between an originating acoustic signal and an echo signal in a conduit, the method comprising:
(a) measuring at a first position a combined acoustic signal that comprises the originating acoustic signal propagating along the conduit and the echo signal, wherein the echo signal is generated by the originating acoustic signal reflecting off of an acoustic reflector in the conduit after propagating past the first position;
(b) determining an autocorrelation of the combined acoustic signal; and
(c) identifying the echo signal by identifying a peak at a time greater than zero, wherein the time greater than zero is the lag time.

15. The method of claim 14 further comprising determining a distance between the first position and the acoustic reflector from a velocity of the echo signal as it propagates between the first position and the acoustic reflector and the lag time.

16. The method of claim 14 further comprising determining a location of the acoustic reflector by determining the lag time at multiple distances along the conduit, making a plot by plotting the lag time against the distances and determining a y-intercept of the plot.

* * * * *